United States Patent [19]
Kobayashi

[11] Patent Number: 5,986,739
[45] Date of Patent: Nov. 16, 1999

[54] LIQUID CRYSTAL PANEL SUBSTRATE, ITS FABRICATION METHOD, LIQUID CRYSTAL DEVICE AND ELECTRONIC APPARATUS

[75] Inventor: Yoshifumi Kobayashi, Suwa, Japan

[73] Assignee: Seiko Epson Corporation, Suwa, Japan

[21] Appl. No.: 08/829,820

[22] Filed: Mar. 25, 1997

[30] Foreign Application Priority Data

Mar. 27, 1996 [JP] Japan .................................. 8-071876
Jan. 27, 1997 [JP] Japan .................................. 9-012903

[51] Int. Cl.$^6$ .................................................. G02F 1/1339
[52] U.S. Cl. .......................... 349/143; 349/40; 349/145; 349/146; 349/139; 349/148
[58] Field of Search .............................. 349/143, 40, 145, 349/146, 139, 148

[56] References Cited

U.S. PATENT DOCUMENTS 5,406,398   4/1995   Suzuki et al. .

FOREIGN PATENT DOCUMENTS 59-42583   3/1984   Japan .

*Primary Examiner*—Robert H. Kim
*Attorney, Agent, or Firm*—Oliff & Berridge, PLC

[57] ABSTRACT

A liquid crystal panel substrate is used as a translucent substrate with a liquid crystal panel. The liquid crystal panel has a display region and a non-display region disposed outside of the display region. A plurality of electrodes are disposed across the display region and the non-display region of the liquid crystal panel. Each electrode has a width differing between the display region and the non-display region.

11 Claims, 9 Drawing Sheets

LIQUID CRYSTAL PANEL SUBSTRATE, ITS FABRICATION METHOD, LIQUID CRYSTAL DEVICE AND ELECTRONIC APPARATUS

BACKGROUND OF THE INVENTION

1. Field of the Invention

The present invention relates to a liquid crystal panel substrate having a fine pitch electrode structure, a method of manufacturing the substrate, a liquid crystal device created using the substrate and an electronic apparatus that includes the liquid crystal device.

2. Description of Related Art

In recent years, liquid crystal devices have become utilized widely as the displays of portable electronic apparatuses such as portable telephones, electronic notepads, and the like. This is largely due to the characteristic of liquid crystal devices as having low power consumption. Thus, conventional liquid crystal devices have little display capacity and are used to display characters and segments. However, because of increases in memory capacity and improvements in data communication technology, a demand has arisen for liquid crystal displays having greater display capacities. Because of this, many dot matrix type liquid crystal devices capable of large-volume display including graphics also have come to be used.

An indispensable quality control matter in the manufacture of such a dot matrix type liquid crystal device is the testing at the appropriate time for shorts or breaks among the display electrodes, and sending down the manufacturing process the substrate components assured by that testing to be good. A conventional method of testing for shorts and breaks of display electrodes is disclosed in Japanese Laid-Open Patent No. 59-042583. Namely, when testing electrodes of a translucent electrode pattern, shorts and breaks are detected electrically by printing voltage, for example direct current voltage, on the translucent electrode pattern, and by detecting the voltage taken by the various electrodes by contacting a short needle (a probe) to the surfaces of the translucent electrodes and moving the probe at a constant velocity.

FIG. 10 shows one example of an electrode arrangement of a conventional liquid crystal panel substrate and an electrode test method. Specifically, FIG. 10 shows that when the terminal for making a connection with an external circuit, i.e., external connection terminal 51, is electrically isolated from external electrode 52, testing probe 54 is contacted to one of multiple electrodes 53, and voltage, for example direct current voltage, is printed. Furthermore, a separate testing probe 56 is contacted to the end of an electrode on the opposite side of terminal 51 on electrode 53. The change in voltage is detected between probe 54 and probe 56. Another testing probe 57 is also contacted to the neighboring electrode 53, and the change in voltage is detected between probe 56 and probe 57.

FIG. 11 shows that a change in voltage is detected by moving probe 54 and probe 56 among the multiple electrodes as shown by arrow A while being connected to the same electrode, and reading the voltage by probe 54 during that movement. There is no electrical break in electrode 53 between probe 54 and probe 56 when the voltage detected by probe 54 is high (Vh). Thus, electrode breaks can be detected by probe 54 and probe 56.

On the other hand, the presence or absence of shorts between the neighboring electrodes 53 and 53 can be detected by moving probe 56 and probe 57 among the multiple electrodes as shown by the arrow A while being connected to neighboring electrodes, and reading the voltage by probe 57 during that movement. The voltage detected by probe 57 is always 0 if there is no short between those electrodes. However, a voltage is detected if there is a short between those electrodes. Thus, detecting electrode breaks and shorts between electrodes as described above, assures that electronic components having no defects are sent to the next process.

FIG. 12 shows another example of an electrode arrangement of a conventional crystal panel substrate and electrode test method. This method is used when every other electrode 53 is connected purposefully to external electrode 52, i.e., when they are shorted. Testing probe 54 is connected to external electrode 52, voltage, for example direct current voltage, is printed and another testing probe 56 is connected to a terminal end on the opposite side of external connection terminal 51 in the same manner as shown in FIG. 10. Furthermore, probe 56 is moved among the multiple electrodes as shown by arrow A, the difference in potential is detected by probe 56, and shorts between electrodes and electrode breaks are detected based on the difference in potential.

When the multiple electrodes 53 are normal, both the high voltage Vh and the low voltage Vl alternate as shown in FIG. 13. Also, when there is a break in the connection between electrode 53 and external electrode 52, there is no voltage peak for the electrode that should be high voltage Vh, i.e., the location of electrode number 3 shown in FIG. 14. Also, when there is a short between two neighboring electrodes 53 and 53, high voltage is detected in succession, as shown in FIG. 15. Thus, this conventional method uses the presence or absence of voltage printing alternates for every other electrode, to detect electrode breaks shorting with an external electrode and shorts between electrodes by moving one probe.

Because of restrictions of mechanical precision, limitations exist as to how small the cross-sectional area of the tip of the testing probe can be formed. Also, as shown microscopically, the tip of the probe contacts an electrode of the liquid crystal panel face. As a result, there was a problem that, in either of the above-mentioned testing methods, as the inter-electrode gap becomes smaller, the tip of the probe may straddle the gap and contact two adjacent electrodes. If this problem occurs in the conventional apparatus and method shown in FIG. 10, in which all the electrodes are electrically independent from the external electrode, both probe 56 and probe 57 may straddle a single electrode 53 and contact each other. Thus, probe 57 will always receive voltage, which will be misinterpreted as the existence of a short between the electrodes even when there is no short, and a correct determination is impossible.

Also, in the conventional apparatus and method shown in FIG. 12, in which every other electrode of the multiple electrodes 53 is in contact with external electrode 52, when the contact region of probe 56 is larger than the gap of the neighboring electrodes, probe 56 always receives high voltage and a correct determination is likewise impossible. Also, when it is determined that there is a short between electrodes, given the appearance of high voltage Vh in a location of low voltage Vl, it becomes impossible to detect the low voltage Vl region necessary to detect this short if the contact region of probe 56 is large. Thus, the problem exists that if there really is a short, it will be impossible to detect.

Consequently, the conventional testing methods shown in FIGS. 10 and 12, have the limitation that the inter-electrode interval must be at least 20 μm at an inter-electrode pitch of at least 250 μm. However, in recent years, the level demanded for liquid crystal devices is narrower than such a limit. For example, an inter-electrode gap of as little as 10 μm at an inter-electrode pitch of as little as 180 μm is being investigated.

SUMMARY OF THE INVENTION

The object of the invention is to solve the above-mentioned problems. Specifically, it is an object of the invention to test for shorts and breaks for a plurality of electrodes that are arranged with a narrow inter-electrode gap by improving the shapes of the electrodes. It is also an object of the invention to improve the quality of a liquid crystal device having a plurality of electrodes arranged with a narrow inter-electrode pitch and a narrow inter-electrode gap. It is a further object of the invention to make it possible to manufacture with stability an electronic apparatus that has a liquid crystal device with large display capacity yet is small in size, by improving the quality of such a liquid crystal device.

The liquid crystal panel substrate in accordance with the invention includes multiple electrodes disposed across two regions of a liquid crystal panel. The two regions include a display region and a non-display region which is disposed outside of the display region. Each electrode has an electrode width differing between the display region and the non-display region.

The electrode width inside the non-display region can be set narrower than the electrode width inside the display region. When testing for shorts and breaks for the multiple electrodes having measurements established in this manner, a wide gap can be provided between neighboring electrodes if testing is performed by contacting the testing probe to the section having narrow width in the non-display region of the various electrodes, even if the inter-electrode gap of the multiple electrodes arranged in the display region is narrow. Thus, the testing probe can be prevented from straddling and connecting neighboring electrodes, which allows accurate testing to be performed.

An external electrode can be formed outside the display region. Also, the multiple electrodes formed on the liquid crystal panel substrate can be divided into an electrode group which is connected to the external electrode and an electrode group which is not connected to the external electrode.

The electrode width inside the non-display region can be set narrower than the electrode width inside the display region. By doing this, a wide gap can be provided between neighboring electrodes in the non-display region, which enables correct testing. Also, if one testing probe is contacted to the external electrode and another testing probe is contacted to the ends of the multiple electrodes, and the probes are moved among the individual electrodes, both electrode breaks and shorts can be tested with at least the two probes.

If the electrode width inside the non-display region is narrower than the electrode width inside the display region, the thickness of the liquid crystal layer may be irregular in the section having the narrower electrode width. Color irregularities may be caused in the display region of the liquid crystal device because of the irregular thickness of the liquid crystal layer. In order to eliminate this problem, in the above-mentioned liquid crystal panel substrate having an external electrode, while the electrode width inside the non-display region can be made narrower than the electrode width inside the display region, regarding each electrode belonging to the above-mentioned connected electrode group, the electrode width inside the non-display region can be made wider than the electrode width inside the display region, regarding each electrode included in the above-mentioned non-connected electrode group. The irregularity of thickness of the liquid crystal layer disappears because the exclusive surface area of the electrodes becomes uniform. As a result, color irregularities caused by the irregular thickness of the liquid crystal layer can be prevented.

As is clear from the above explanation, when testing the electrodes using a probe, the above-mentioned external electrode acts as a common electrode for a plurality of electrodes, i.e., for the multiple electrodes connected to the external electrode. Furthermore, the external electrode can be used to prevent static electricity. The static electricity charged inside the liquid crystal panel substrate can be discharged to the outside by passing the static electricity to the outside via the external electrode, and by discharging the static electricity between the external electrode and the display electrodes.

When the external electrode is used to prevent static electricity, it is desirable that the interval between the display electrodes that are not connected to the external electrode and the external electrode be set narrower than the interval between each mutually adjacent display electrode inside the display region of the liquid crystal panel. This assures that the static electricity will be discharged between the display electrodes and the external electrode.

The method of manufacturing a liquid crystal panel substrate in accordance with the invention includes (1) an electrode formation process that forms a plurality of electrodes across two regions of the liquid crystal panel, i.e., a display region and a non-display region outside of the display region, and (2) a testing process that connects a testing terminal to a section positioned in the non-display region among the electrodes, and furthermore performs testing while moving the testing terminal among the multiple electrodes. Also, each electrode has an electrode width differing between the display region and the non-display region.

The electrode width inside the non-display region can be set narrower than the electrode width inside the display region. Thus, even if the inter-electrode gap of the plurality of electrodes arranged in the display region is narrow, a wide gap can be provided between neighboring electrodes in the non-display region, which enables correct testing.

The liquid crystal device in accordance with the present invention includes a pair of mutually opposing translucent substrates. A gap is maintained between the substrates. A liquid crystal is enclosed within the gap. Also, at least one side of the pair of translucent substrates includes multiple electrodes disposed across two regions of the liquid crystal panel. The regions include a display region and a non-display region outside of the display region. Each of these electrodes has an electrode width differing between the display region and the non-display region. The electrode width inside the non-display region can be made narrower than the electrode width inside the display region. The invention enables the testing of electrodes having an electrode pattern of small inter-electrode pitch. Thus, the high-yield manufacture of small-scale and high-capacity liquid crystal devices can now be manufactured.

An electronic apparatus in accordance with the invention includes the above-mentioned liquid crystal device, a power supply that supplies electric power to the liquid crystal device, and a controller that controls the operation of the liquid crystal device. Specifically, the above-mentioned liquid crystal device can be used as a visual information display for portable telephones, electronic notepads, video cameras, and various other electronic apparatuses. High-reliability testing of breaks and shorts of the multiple electrodes of the liquid crystal panel of the liquid crystal device can be performed even when the inter-electrode pitch and inter-electrode gap are narrow. This testing prevents poor liquid crystal devices from being mistakenly built into an electronic apparatus, and enables both small-scale and large-display capacity electronic apparatuses to be manufactured.

Further objects, details and advantages of the invention will be apparent from the following detailed description, when read in conjunction with the drawings.

DETAILED DESCRIPTION OF PREFERRED EMBODIMENTS

First Embodiment

Figure 1:
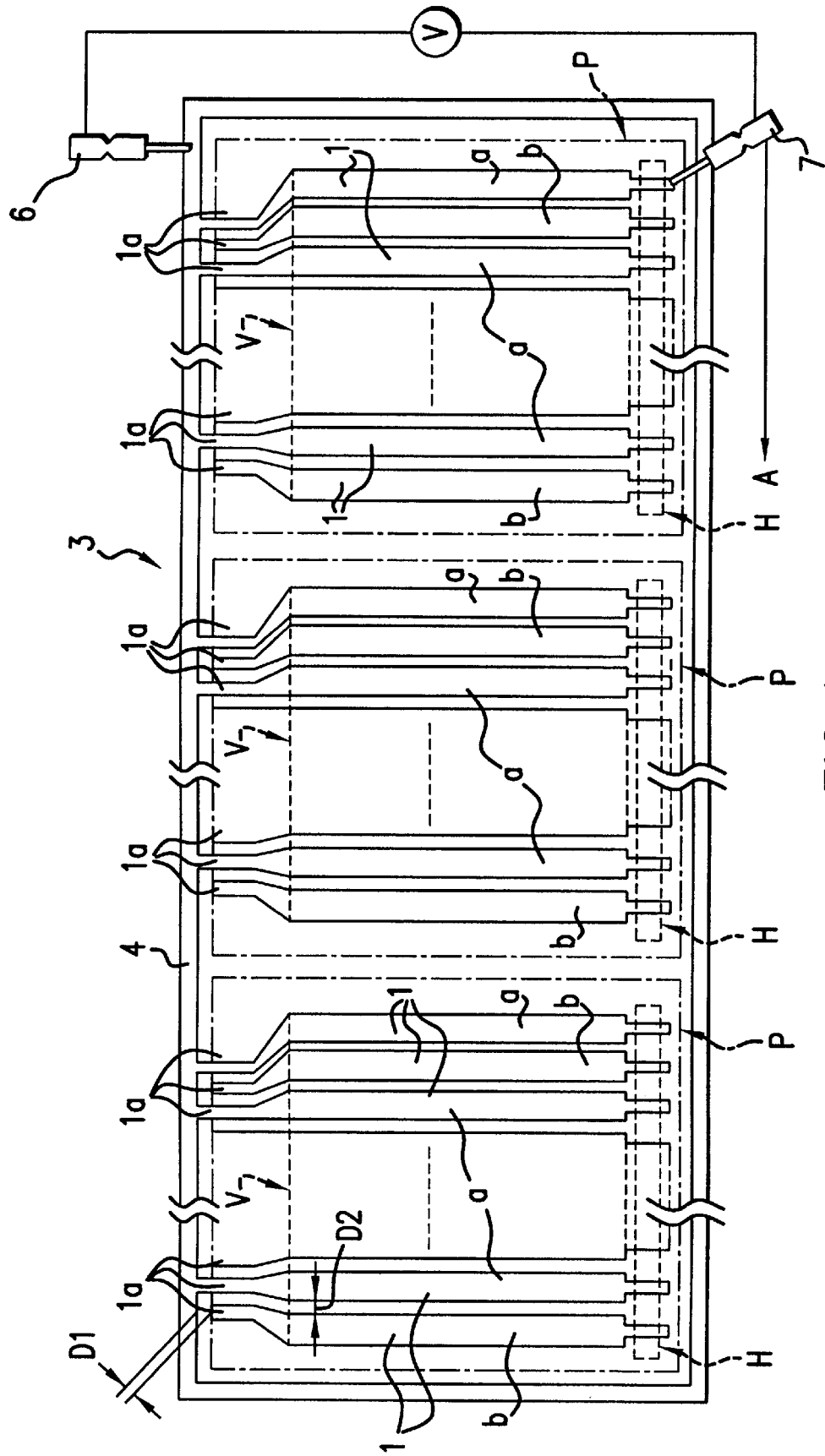
FIG. 1 is an elevational view showing a liquid crystal panel substrate and a method of manufacturing the substrate in accordance with an embodiment of the invention.
Figure 5:
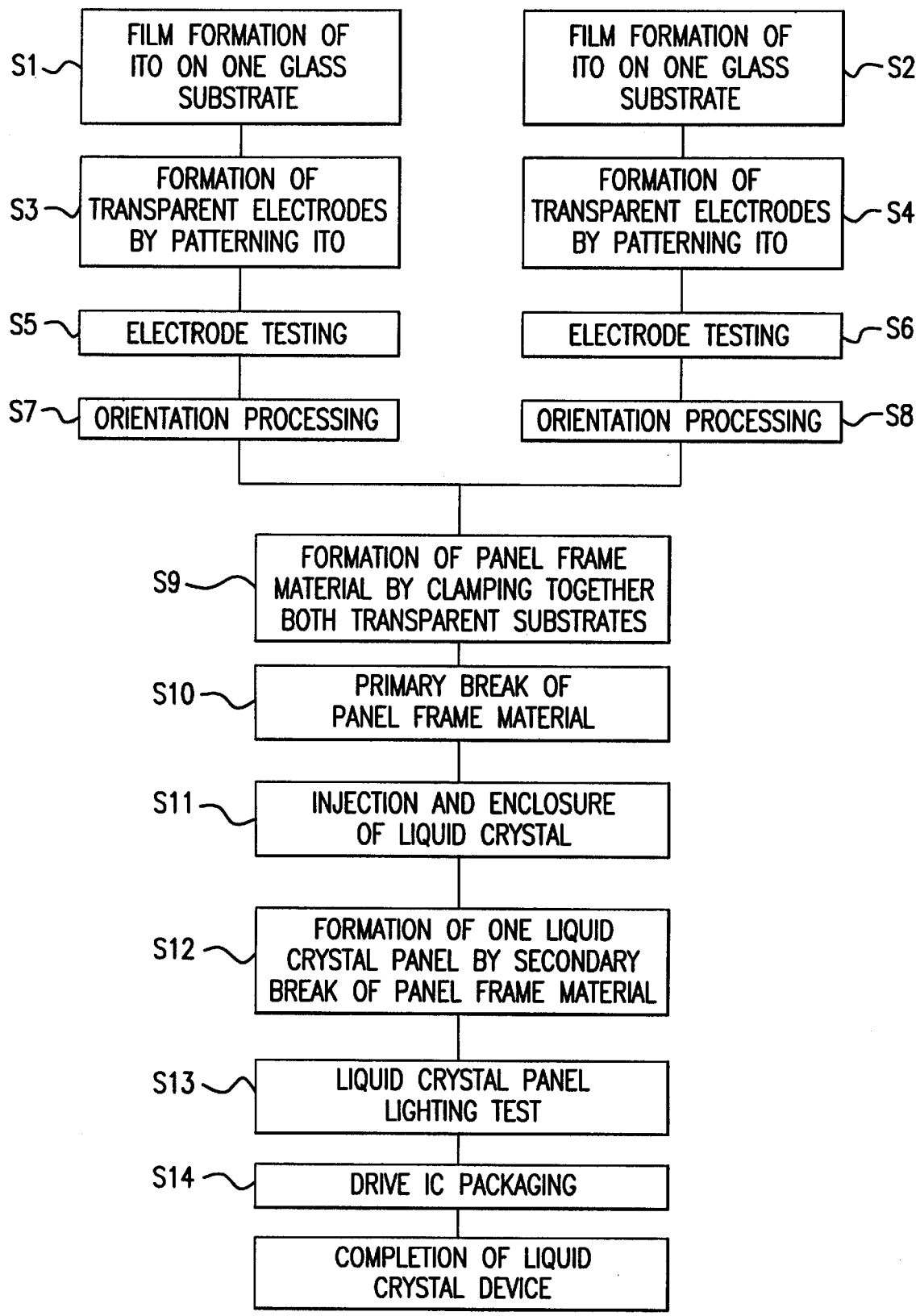
FIG. 5 shows a method of manufacturing a liquid crystal device and liquid crystal panel substrate in accordance with an embodiment of the present invention.

FIG. 5 shows a method of manufacturing a liquid crystal panel substrate in accordance with the invention. An ITO (indium tin oxide) film is formed by a sputtering method on each of at least two prepared soda glass substrates (Step S1, Step S2). The ITO film is 10–20 Ω/sq and is a transparent electrode film. Subsequently, the transparent electrodes are formed to the specified shape by photolithography for each glass substrate. For example, the stripe shapes are shown in FIG. 1 (Step S3, Step S4).

Ordinarily, multiple liquid crystal panels are formed. For example, three transparent electrodes 1 are formed on one glass substrate. FIG. 1 only shows the electrode pattern for one glass substrate. However, the same electrode pattern is formed on another glass substrate. The liquid crystal panel substrates (reference number 3 on FIG. 1) are formed by this process to become the base of the transparent substrates (reference numbers 2a and 2b of FIG. 7) which are used for holding the liquid crystal in the liquid crystal panel.

Subsequently, it is tested whether or not there are breaks and shorts between the multiple electrodes, i.e., the transparent electrodes 1, formed on the liquid crystal panel substrate (Step S5, Step S6). The defective products that have breaks and shorts are discarded. Orientation processing is performed on the products that do not have breaks and shorts (Step S7, Step S8). Specifically, an orientation film is formed on the electrode surface of each liquid crystal panel substrate, and rubbing processing is applied.

Subsequently, a panel frame material is formed by clamping together the liquid crystal panel substrates sandwiching a sealant (Step S9). The electrode regions for three liquid crystal panels are included in the panel frame material. The panel frame material is broken, i.e., the primary break (Step S10), in order to expose to the outside the liquid crystal injection port of the panel frame material. The liquid crystal is injected via the liquid crystal injection port which is exposed. Subsequently, the liquid crystal injection port is sealed with a sealant (Step S11). Thus, the liquid crystal is enclosed in the three liquid crystal panel regions contained in the panel frame material.

Subsequently, the panel frame material having the liquid crystal enclosed is divided into three individual liquid crystal panels by applying a secondary break (Step S12). By printing the specified drive voltage to each electrode of each liquid crystal panel formed in this manner, the display of the liquid crystal panel is lighted to determine whether the lighting is normal (Step S13). If the lighting is abnormal, that liquid crystal panel is discarded as a defective product. If the lighting is normal, the liquid crystal device is completed by installing a drive IC in Step S14.

FIG. 1 shows a liquid crystal panel substrate 3 manufactured after finishing Step S3 or Step S4 of FIG. 5. A number of transparent electrodes for three liquid crystal panels are formed on the liquid crystal panel substrate 3. Each of the regions indicated by reference letter P has one liquid crystal panel. Each of the regions indicated by reference letter V becomes a display region in each liquid crystal panel.

An annular external electrode 4 is formed on the perimeter of the liquid crystal panel substrate 3. An external connection terminal 1a is formed for each electrode 4 on the end adjacent the external electrode 4. Each electrode is connected via the external connection terminals 1a to the drive IC.

The multiple electrodes 1 are divided into an electrode group A connected to the external electrode 4 and an electrode group B not connected to the external electrode 4. The Group A and Group B electrodes are arranged alternatingly. The gap D1 which extends between the end of each electrode 1 of the non-connected electrode group B and the external electrode 4 is set to be narrower than the gap D2 which extends between mutually adjacent electrodes 1 in the display region V. Each electrode 1 is disposed across two regions, i.e., the display region V and the non-display region H (which is outside of the display region V). FIG. 1 shows that the electrode width of the section of each electrode of the non-display region H is set to be narrower than the electrode width of the section of the display region V.

When performing electrode testing in Step S5 or S6 of FIG. 5, testing probe 6 contacts external electrode 4 on the periphery. Another testing probe 7 connects the narrow-width electrode section of the non-display region H. Voltage is printed to each electrode 1. Each electrode 1 is scanned by moving probe 7 at a constant velocity, in the direction indicated by arrow A. During this scanning, the difference in potential at each electrode 1 is detected by probe 7. Each electrode 1 is tested for shorts and breaks based on this difference in potential.

Figure 2:
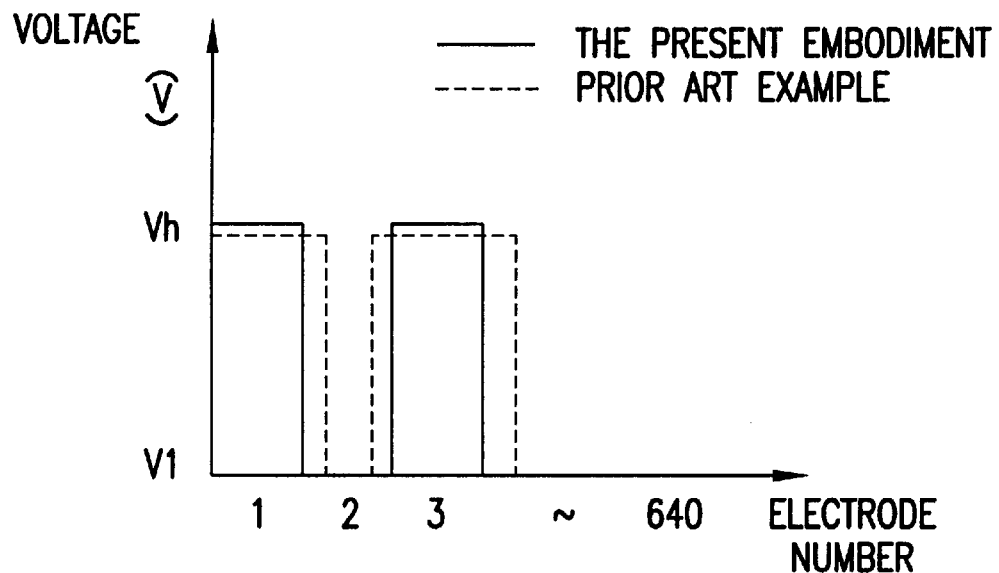
FIG. 2 is a graph comparing the electrode test results of the manufacturing method of the present invention with the electrode test results of a conventional manufacturing method.

In the embodiment shown in FIG. 2, the electrode width of the electrodes included in the non-display region H, i.e., the electrodes scanned by probe 7, is narrower than the electrode width of the electrodes included in the display region V, even when the interval between electrodes inside the display region V is narrow. Thus, a low-voltage V1 region can be secured that is wider than the conventional method (dotted lines) which sets the electrode width of the testing region to the same as the electrode width of the display region V. As a result, proper testing of the electrodes can be performed even when the electrodes inside the display region V are formed in a fine pitch pattern.

Second Embodiment

Figure 3:
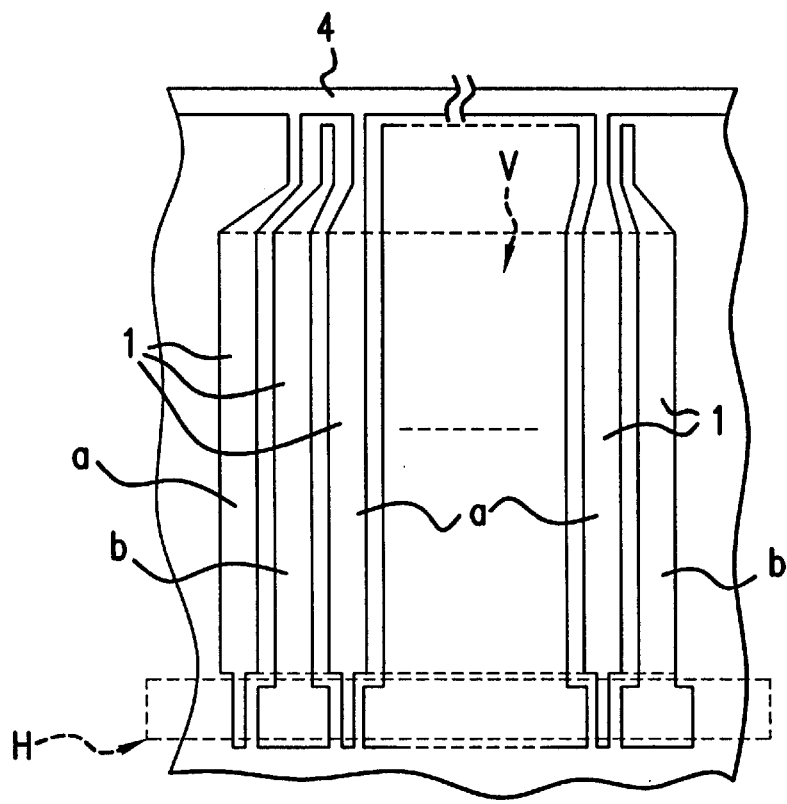
FIG. 3 is an elevational view showing the essential components of a liquid crystal panel substrate in accordance with another embodiment of the present invention.

FIG. 3 shows the essential components of another embodiment of the liquid crystal panel substrate. The difference between this embodiment and the previous embodiment shown in FIG. 1 is that, regarding the electrodes 1 of the connected electrode group A, the electrode width inside the non-display region H is narrower than the electrode width inside the display region V. However, regarding the electrodes 1 of the non-connected electrode group B, the electrode width inside the non-display region H is wider than the electrode width inside the display region V. In this embodiment as well, a test waveform can be obtained by connecting a testing probe to the electrode sections inside the non-display region H, and by scanning each electrode section with the probe. Therefore, this embodiment enables the testing of electrodes of a narrow pitch pattern, which was not possible with the conventional testing method.

In an STN (super twisted nematic) mode liquid crystal device, the thickness of the transparent electrodes is 500–2000 Å°. Because this thickness of the substrate is far greater than the 30 Å° limit of irregularity sought for, it is easy for irregularities in thickness to occur in the liquid crystal layer between the transparent electrode section and the non-transparent electrode section. If such irregularities in thickness occur, color irregularities may be caused inside the display region of the liquid crystal device. However, as shown in FIG. 3, the exclusive surface area of the transparent electrodes inside the non-display region can be increased, if the electrode section inside the testing region, i.e., the non-display region H, is formed as an alternating meshed pattern of a shape narrower than the electrode width inside the display region and a shape wider than that. As a result, color irregularities inside the display region of the liquid crystal device caused by irregular thickness of the liquid crystal layer can be prevented.

Third Embodiment

Figure 4:
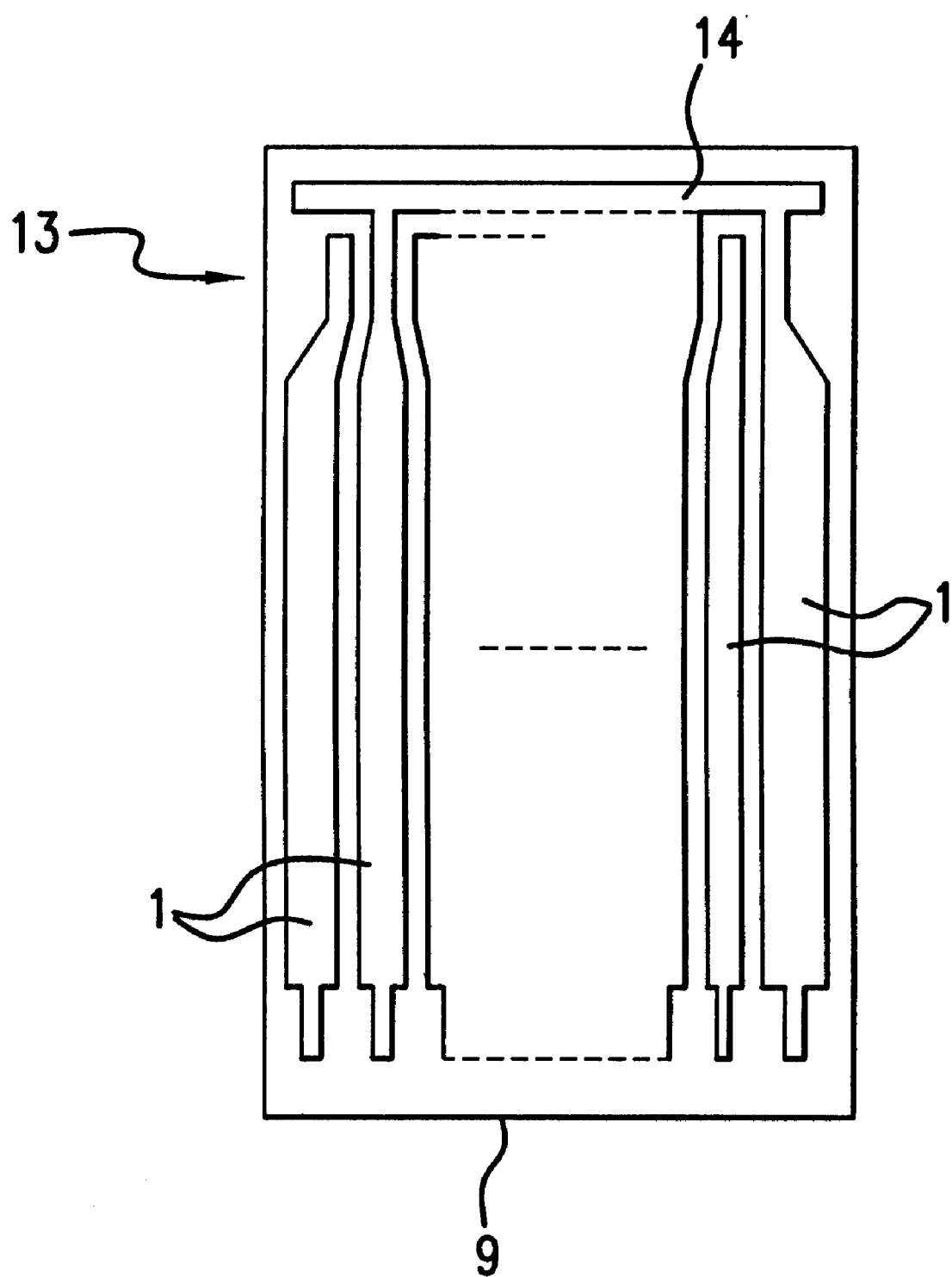
FIG. 4 is an elevational view showing a liquid crystal panel substrate in accordance with yet another embodiment of the present invention.

In the embodiment shown in FIG. 4, an external electrode is not provided in the entire region of the perimeter of the liquid crystal panel substrate. Instead, an external electrode 14 is provided on one side of the substrate. The embodiment of FIG. 1 is the same as the embodiment shown in FIG. 4, except that if the transparent electrodes 1 are arranged in a pattern such that the terminal section for testing the transparent electrodes 1 does not rest on the substrate end surface 9 of the liquid crystal device, when the liquid crystal device has been completed, because the ends of the transparent electrodes 1 are no longer exposed to the outside from the substrate end surface 9, shorts of the transparent electrodes 1 can be prevented. Thus, a liquid crystal device having a good level of color irregularities can be provided.

Fourth Embodiment

Figure 6:
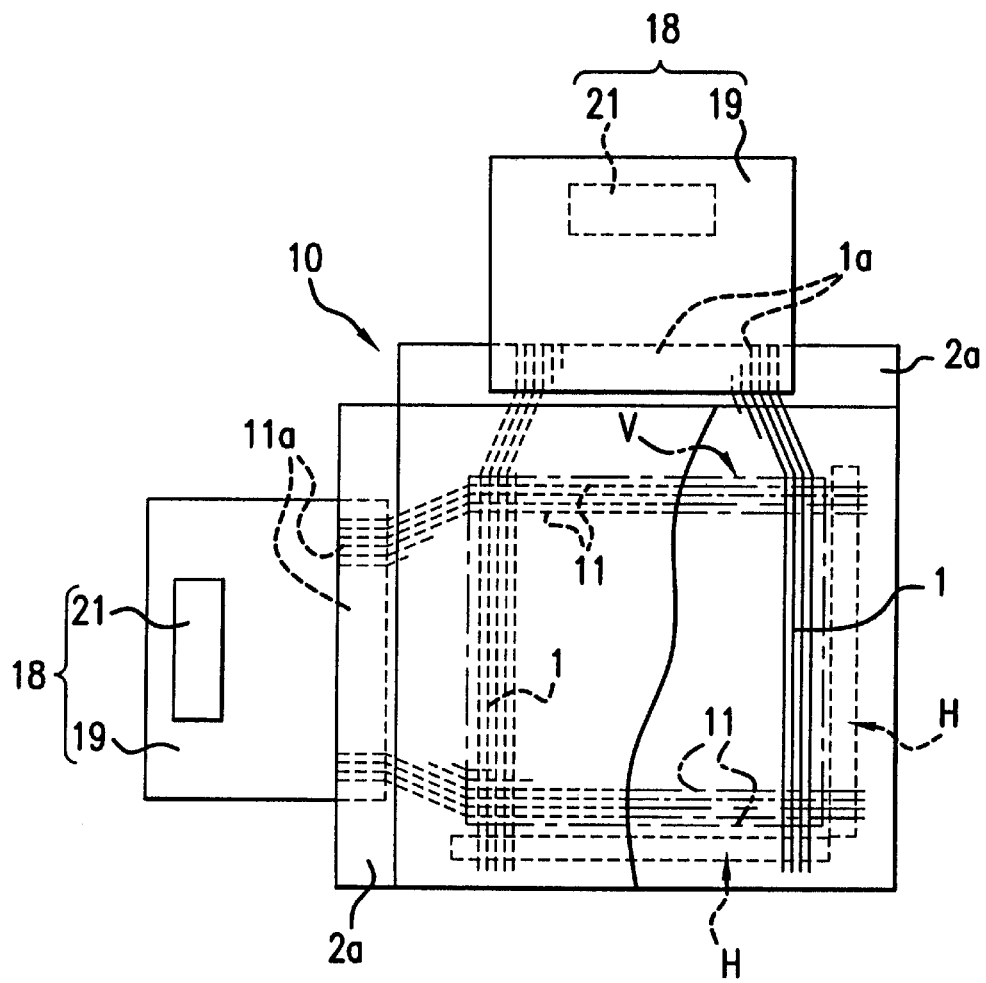
FIG. 6 is a partial sectional view showing a liquid crystal device in accordance with an embodiment of the present invention.

FIG. 6 shows an embodiment of a liquid crystal device in accordance with the present invention. This liquid crystal device 10 is obtained after finishing the packaging process of the drive IC of Step S14 in the manufacturing process shown in FIG. 5. The liquid crystal device 10 shown in FIG. 5 has a pair of mutually opposing transparent substrates 2a and 2b. One of the transparent substrates, for example transparent substrate 2b, is obtained by cutting the liquid crystal panel substrate 3 shown in FIG. 1. The other transparent substrate 2a cannot be obtained from the liquid crystal panel substrate 3 shown in FIG. 1, and instead is obtained by cutting another liquid crystal panel substrate which is formed in the same manner as the liquid crystal panel substrate 3.

Returning to FIG. 6, the stripe-shaped transparent electrodes 1 explained with reference to FIG. 1 are formed on the surface of transparent substrate 2b. Also, stripe-shaped transparent electrodes 11 are formed in the same manner on the surface of the other transparent substrate 2a. The transparent electrodes 1 and 11 intersect each other when the pair of transparent substrates 2a and 2b are assembled. Also, their points of intersection form the pixels for the liquid crystal display. The display region V is formed by arranging the multiple pixels in a matrix pattern.

Figure 7:
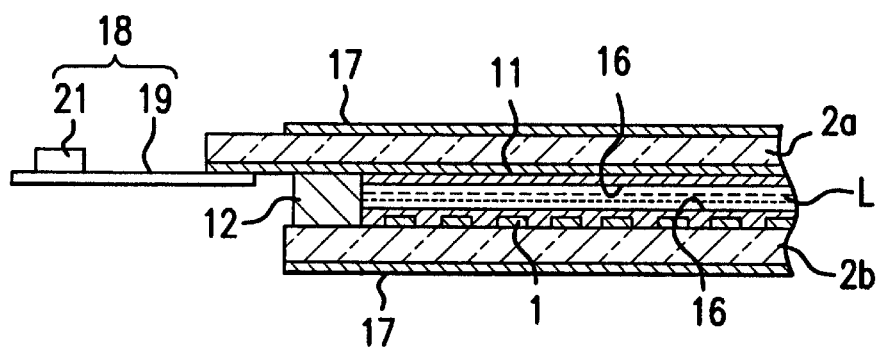
FIG. 7 is a sectional view showing the structure of the liquid crystal device of FIG. 6.

As shown in FIG. 7, transparent substrate 2a and 2b are adhered to each other by a sealant. Orientation films 16 are formed on the electrode-forming surface of each substrate 2a and 2b. The liquid crystal 1 is enclosed in the gap which extends between the transparent substrates 2a and 2b, i.e, the cell gap. Polarizing plates 17 and 17 are pasted on the outside surface of each transparent substrate 2a and 2b, according to need.

As shown in FIG. 6, TCPs (tape carrier packages) are conductively connected by an ACF (anisotropic conductive film) or other bonding agent to the external connection terminals 1a of the transparent electrodes 1 that are formed on the transparent substrate 2b and the external connection terminals 11a of the transparent electrodes 1 that are formed on the other transparent substrate 2a. The TCPs 18 are formed on the surfaces of the FPCs (flexible printed circuits) 19 forming a wiring pattern by packaging the drive IC 21 using TAB (tape automated bonding) technology. The drive IC 21 prints voltage on each transparent electrode 1 and 11 in accordance with a simple matrix drive method, and displays the desired visual images on the display region V.

On each transparent substrate 2a and 2b of the liquid crystal device 10, the electrode width of the electrodes included in the non-display region H outside the display region V, as shown in FIGS. 1, 3 or 4, differs from the electrode width of the electrodes inside the display region V.

Fifth Embodiment

Figure 8:
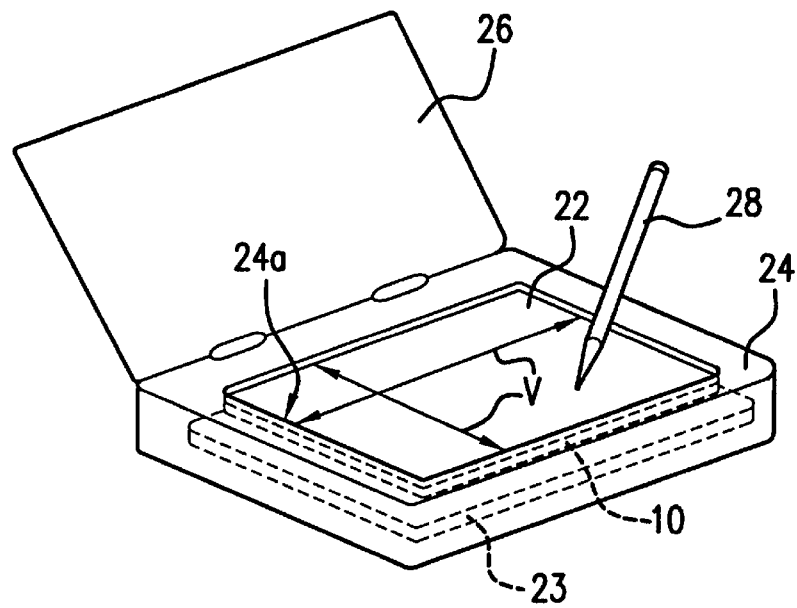
FIG. 8 is a perspective view showing an electronic apparatus in accordance with an embodiment of the present invention.

FIG. 8 shows an embodiment of an electronic apparatus in accordance with the invention. This embodiment is preferred when using the liquid crystal device as the display of an electronic notepad of an electronic apparatus. The electronic notepad has a case 24. Inside the case 24 are housed a liquid crystal device 10, for example, as shown in FIG. 6, a transparent touch panel 22 placed on the liquid crystal device 10, and a PCB (printed circuit board) 23. The upper surface of the case 24 forms an opening 24a. The display region V of the liquid crystal device 10 is exposed through the opening 24a. A flat cover 26 is freely rotatable in order to open and close the opening 24a.

The transparent touch panel 22 is known as a data input device. Various types of data are input by pressing the appropriate locations of the transparent touch panel 22 using a pen 28 or other input device, or by entering characters, and the like, into the specified locations of the transparent touch panel 22 using the pen 28.

Figure 9:
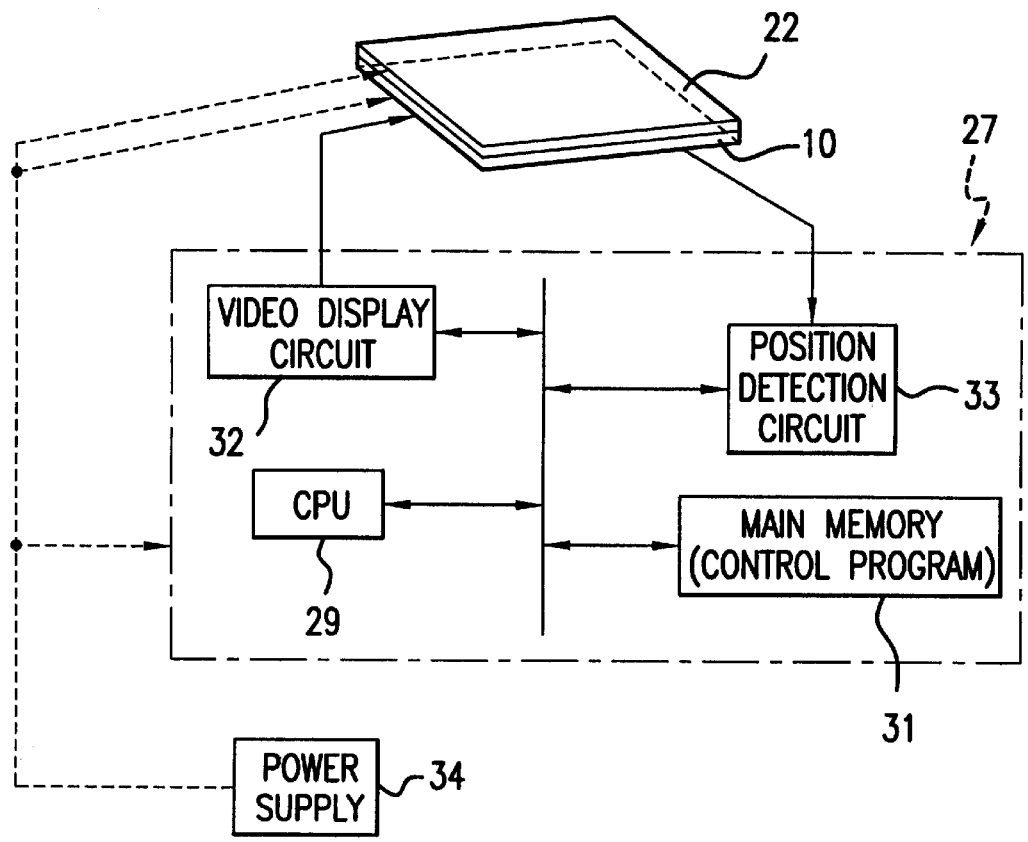
FIG. 9 is a circuit block drawing showing one example of an electrical control system of the electronic apparatus of FIG. 8.
Figure 10:
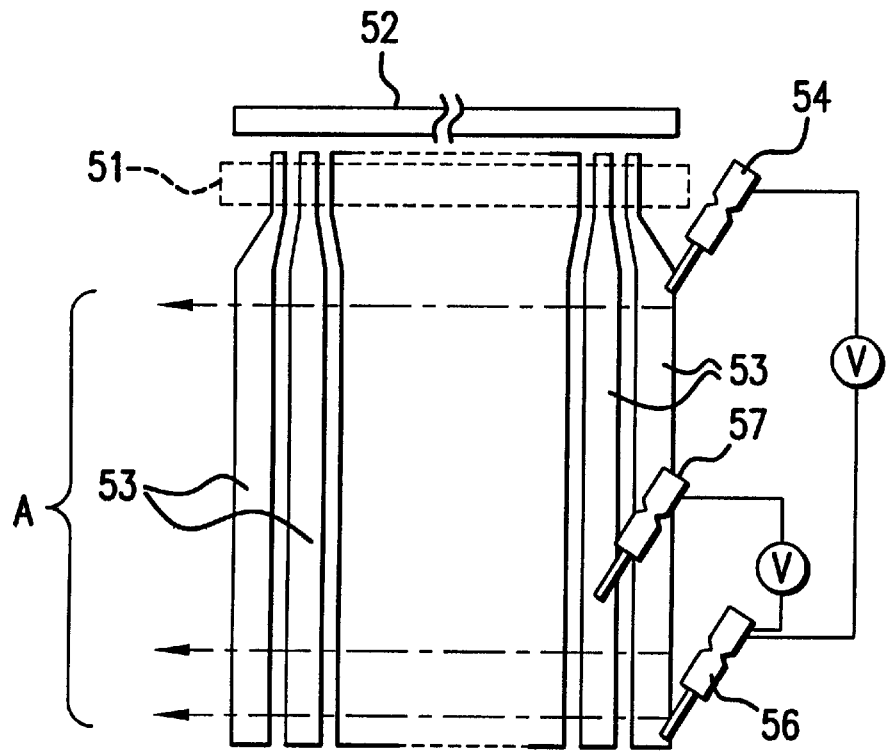
FIG. 10 is an elevational view showing one example of an electrode arrangement of a conventional liquid crystal panel substrate and an electrode test method.
Figure 11:
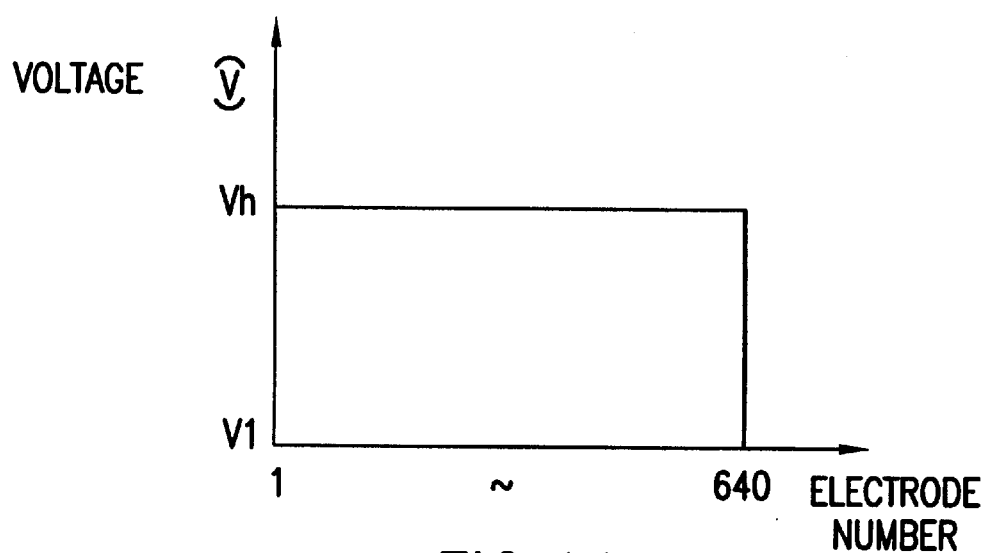
FIG. 11 is a graph showing the results of the test method of FIG. 10.
Figure 12:
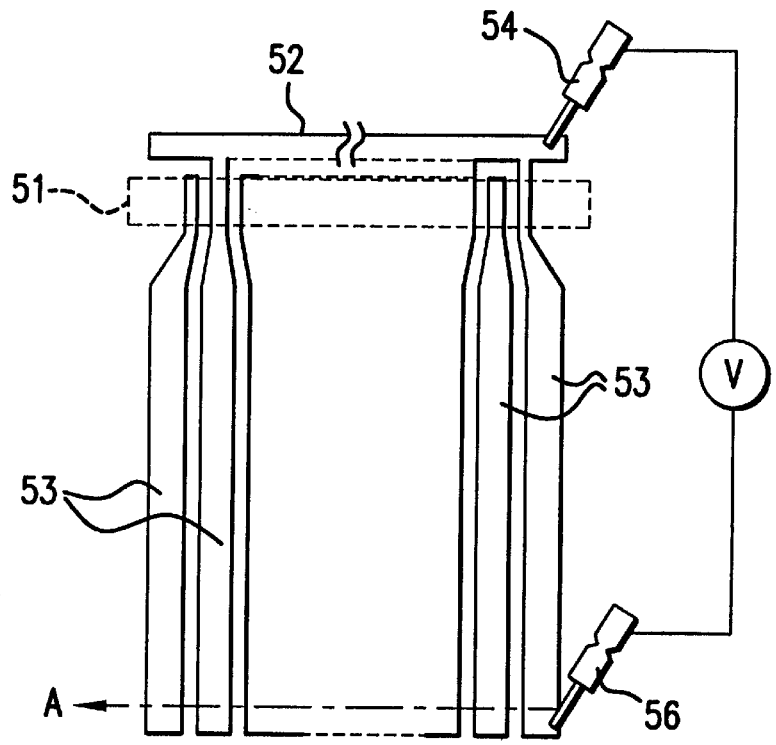
FIG. 12 is an elevational view showing another example of an electrode arrangement of a conventional crystal panel substrate and electrode test method.
Figure 13:
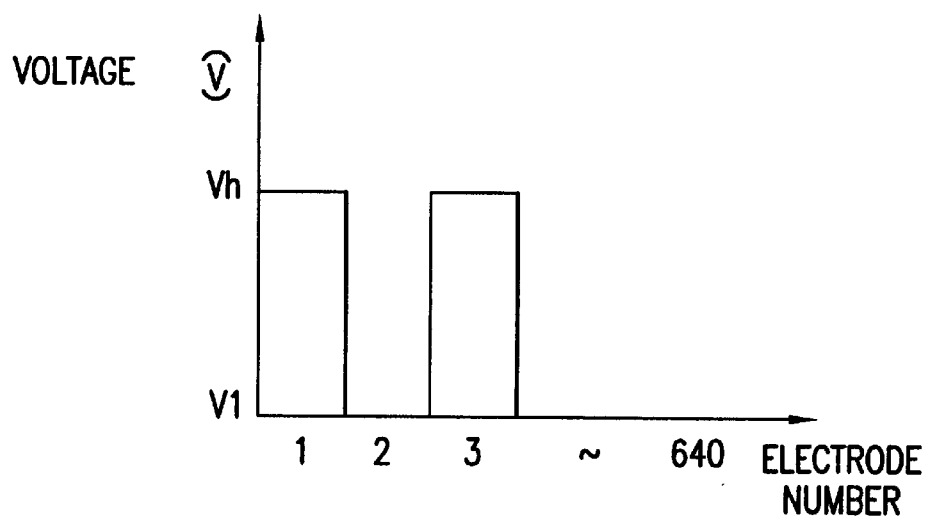
FIG. 13 is a graph showing one example of the results of the test method of FIG. 12.
Figure 14:
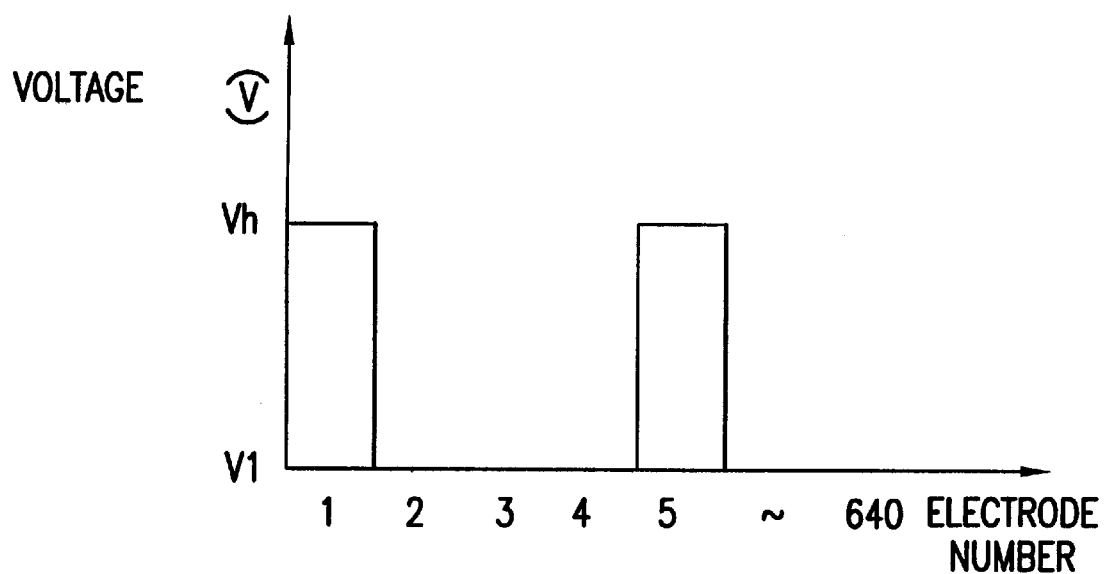
FIG. 14 is a graph showing another example of the results of the test method of FIG. 12.
Figure 15:
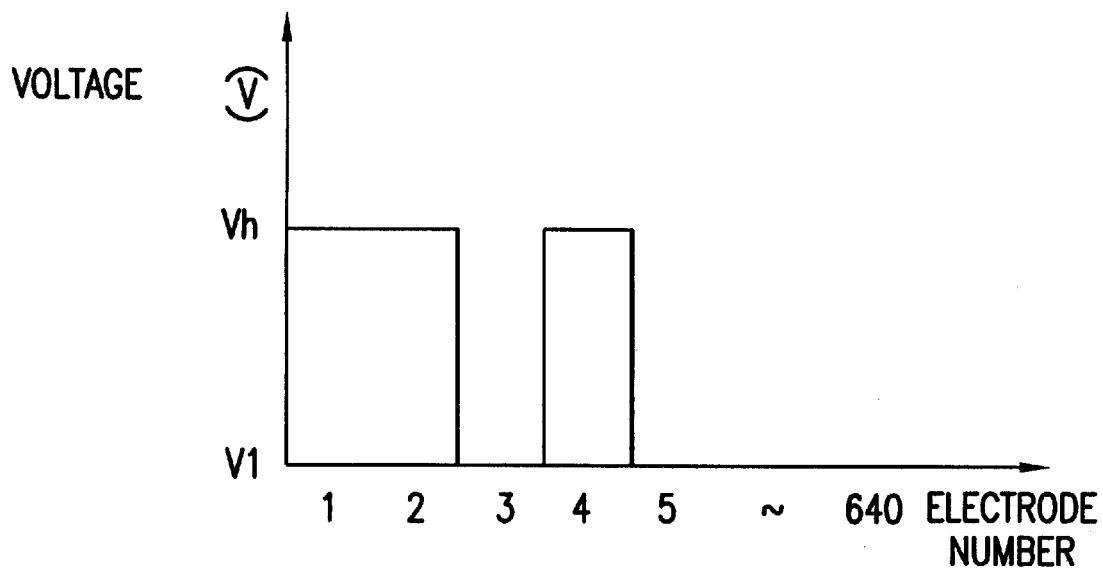
FIG. 15 is a graph showing yet another example of the results of the test method of FIG. 12.

A control circuit 27 is installed on the PCB 23, as shown in FIG. 9. The control circuit 27 has a CPU (central processing unit) 29 that performs various types of computations, a main memory 31 which stores the programs for the functions of an electronic notepad, a video display circuit 32 which sends drive signals for the video display to the liquid crystal device 10, and a position detection circuit 33 which computes the positions of the coordinates input by the pen 28 based on the output signals of the transparent touch panel 22. A power supply 34 is placed in an appropriate location inside the case 24 of FIG. 8, and supplies electric power to at least the control circuit 27, the liquid crystal device 10, and the transparent touch panel 22.

Other Embodiments

The invention is not limited to the preferred embodiments described above, and can be modified.

For example, the embodiment of FIG. 1, has electrodes for three liquid crystal panels formed on the liquid crystal panel substrate. However, the number of electrodes is not limited to this. Electrodes can be provided for fewer liquid crystal panels or more liquid crystal panels. The external electrode 4 is not necessarily formed.

Also, FIG. 5 merely shows one example of a method of manufacturing the liquid crystal panel substrate. Also, the processes before and after the electrode testing process (Step S5, Step S6) may be modified according to need.

Also, FIG. 6 merely shows one example of a liquid crystal device. Various methods other than the liquid crystal drive method and drive IC packaging method can be adopted according to need. FIG. 6 shows a simple matrix method as the drive method, and the TAB packaging method as the IC packaging method, but an active matrix drive method and a COG (chip on glass) packaging method, and the like, can also be used. The COG method is a packaging method that mounts an IC chip directly onto the glass substrate of a liquid crystal panel without having an FPC or the like in between.

Also, FIG. 8 shows the use of the present invention with an electronic notepad. However, the present invention may also be applied to portable telephones, video cameras, and various other electronic apparatuses.

In accordance with the liquid crystal panel substrate, the method of manufacturing the liquid crystal panel substrate, the liquid crystal device, and the electronic apparatus, the electrode width inside the non-display region can be set to be narrower than the electrode width inside the display region. When testing for shorts and breaks among the multiple electrodes which are formed in this manner, if testing is performed by connecting a test probe to the section having the narrow width inside the non-display region of each electrode, even if the inter-electrode gap of the multiple electrodes arranged in the display region is narrow, a wide gap between neighboring electrodes can be provided in the non-display region. Thus, the testing probe can be prevented from straddling between and connecting neighboring electrodes, which enables accurate testing to be performed. In short, even if the electrodes inside the display region have a narrow pitch and a narrow interval, correct testing can always can be performed.

By using the external electrode as a common electrode, both breaks and shorts can be tested at the same time with a small number of testing probes. Also, the external electrode can also be used as a terminal for eliminating static electricity from the liquid crystal panel substrate.

By preventing irregularities of thickness in the liquid crystal layer, color irregularities can be prevented in the visual image display of a liquid crystal device.

It is easier to discharge the static electricity between the external electrode and the display electrodes because the interval between the external electrode and the display electrodes is narrower than the gap between display electrodes. Thus, the static elimination function using the external electrode is executed more assuredly.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A panel substrate for use in a display device, the display device having a display region and a non-display region disposed outside of the display region, the panel substrate comprising:

a plurality of electrodes disposed across the display region and the non-display region of the display device, each of said electrodes has (1) a main portion in the display region with first and second ends, (2) an external connection terminal which extends from the first end of said main portion and (3) a testing portion which extends from the second end of the main portion into the non-display region;

wherein the width of the testing portion is narrower than the width of the main portion.

2. A panel substrate for use in a display device, the display device having a display region and a non-display region disposed outside of the display region, the panel substrate comprising:

an external electrode; and a plurality of electrodes disposed across the display region and the non-display region of the display device, said plurality of electrodes including a first group of electrodes connected to said external electrode and a second group of electrodes which are not connected to the external electrode;

wherein each of said electrodes in said first group includes (1) a main portion in the display region with first and second ends, (2) an external connection terminal which extends from the first end of said main portion to said external electrode and (3) a testing portion which extends from the second end of the main portion into the non-display region, the width of the testing portion of the first group is narrower than the width of the main portion of the first group.

3. A panel substrate according to claim 2, wherein each of the electrodes in the second group includes a main portion and a testing portion, said testing portion of said second group extending from the main portion into the non-display region, the width of the testing portion of the second group of electrodes is wider than the width of the main portion of the second group of electrodes.

4. The panel substrate according to claim 2, wherein the external electrode discharges static electricity from the substrate.

5. The panel substrate according to claim 2, wherein the external electrode is located in the non-display region and there is a first gap between the electrodes of said second group of electrodes and the external electrode and a second gap between the main portions of the first and second groups of electrodes, and the first gap is smaller than the second gap.

6. The panel substrate according to claim 2 wherein the electrodes of the first and second groups are alternatively arranged across the panel substrate.

7. A method of manufacturing a display device having a panel substrate, the display device including a display region and a non-display region disposed outside of the display region, the method comprising:

forming a plurality of electrodes across the display and non-display regions such that each of the electrodes includes (1) a main portion in the display region with first and second ends, (2) an external connection terminal which extends from the first end of the main portion to an external electrode and (3) a testing portion which extends from the second end of the main portion into the non-display region, wherein the width of the testing portion is narrower than the width of the main portion; and contacting a testing terminal to the testing portions of said electrodes by moving the testing terminal along the plurality of testing portions.

8. A display device having a pair of mutually opposing panel substrates separated by a gap and liquid crystal located within said gap, wherein the display device has a display region and a non-display region, the display device comprising:

a plurality of electrodes disposed on at least one of the panel substrates and disposed across the display region and the non-display region, each of said plurality of electrodes has a (1) main portion in the display region with first and second ends, (2) an external connection terminal which extends from the first end of said main portion and (3) a testing portion which extends from the second end of said main portion into the non-display region;

wherein the width of the testing portion is narrower than the width of the main portion.

9. An electronic apparatus comprising:

a display device having a pair of mutually opposing panel substrates separated by a gap and liquid crystal located within said gap, wherein the display device has a display region and a non-display region disposed outside the display region;

a power supply that supplies electronic power to the display device; and a controller that controls the operation of the display device;

wherein the display device has a plurality of electrodes disposed on at least one of said pair of mutually opposing panel substrates, each of said plurality of electrodes has (1) a main portion in the display region with first and second ends, (2) an external connection terminal which extends from the first end of said main portion and (3) a testing portion which extends from the second end of said main portion into the non-display region;

wherein the width of the testing portion is narrower than the width of the main portion.

10. A method of manufacturing a display device having a panel substrate, wherein the display device has a display region and a non-display region disposed outside of the display region, the method comprising:

forming an external electrode on the panel substrate;

forming a plurality of electrodes on the panel substrate which are disposed across the display region and the non-display region, the plurality of electrodes is divided into a connected electrode group which is connected to the external electrode and a non-connected electrode group which is isolated from the external electrode, wherein (1) each electrode of said connected electrode group includes (a) a main portion in the display region which has first and second ends, (b) an external connection terminal which extends from the first end to the external electrode and (c) a testing portion which extends from the second end of said main portion to the non-display region, wherein the width of the testing portion is narrower than the width of the main portion, and (2) each electrode of said non-connected electrode group includes a main portion having at least one end and a testing portion which extends from said at least one end into the non-display region, wherein the width of the testing potion is greater than the width of said main portion;

contacting a first testing terminal to the area of the non-display region containing the testing portions of the plurality of electrodes and contacting a second testing terminal to the external electrode; and moving the first testing terminal along the testing portions of the plurality of electrodes.

11. A display device having a pair of mutually opposing panel substrates separated by a gap and liquid crystal disposed within the gap, wherein the display device includes a display region and a non-display region disposed outside of the display region, the display device comprising:

a plurality of electrodes disposed (1) on at least one of said panel substrates and (2) across the display region and the non-display region of the display device;

wherein said plurality of electrodes is divided into first and second sets of electrodes which are alternately arranged on said at least one of the panel substrates, each of said electrodes includes (1) a main portion located in the display region and having first and second ends, (2) an external connection terminal which extends from said first end of said main portion and (3) a second terminal which extends from said second end of said main portion into the non-display region, the width of the second terminal of the first electrodes being narrower than the width of the main portion of the first electrodes and the width of the second terminal of said second electrodes being wider than the width of the main portion of said second electrodes.

* * * * *